United States Patent
Togashi et al.

(10) Patent No.: US 6,876,432 B2
(45) Date of Patent: Apr. 5, 2005

(54) MOVING PICTURE RECORDING/ REPRODUCING APPARATUS AND SCHEDULE SETTING METHOD THEREOF

(75) Inventors: Yuuichi Togashi, Tokyo (JP); Yukio Oya, Ome (JP); Hideki Saito, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/354,092

(22) Filed: Jan. 30, 2003

(65) Prior Publication Data

US 2003/0142273 A1 Jul. 31, 2003

(30) Foreign Application Priority Data

Jan. 31, 2002 (JP) ........................................ 2002-024757

(51) Int. Cl.[7] .......................... G03B 19/18; H04B 1/20
(52) U.S. Cl. ............................................. 352/38; 369/1
(58) Field of Search ......................... 352/38, 244, 166; 348/14, 207, 231.99, 232; 707/3; 369/1, 13; 396/246

(56) References Cited

U.S. PATENT DOCUMENTS

2003/0011680 A1 * 1/2003 Tanaka et al. ........... 348/207.1

FOREIGN PATENT DOCUMENTS

| JP | 8-84315 | 3/1996 |
|----|---------|--------|
| JP | 9-284806 | 10/1997 |
| JP | 10-111917 | 4/1998 |
| JP | 2000-238109 | 9/2000 |
| JP | 2001-136427 | 5/2001 |
| JP | 2002-27388 | 1/2002 |

* cited by examiner

*Primary Examiner*—Rodney Fuller
(74) *Attorney, Agent, or Firm*—Finnegan, Henderson, Farabow, Garrett & Dunner, L.L.P.

(57) ABSTRACT

A moving picture recording/reproducing apparatus has a camera portion to take a moving picture, a compressor/ expander which compresses and expands a video signal and an audio signal, a card slot which receives a memory card that records compressed video and audio data, and an LCD and a speaker which reproduces and outputs the video and audio data recorded in the memory card. This recording/ reproducing apparatus has such a size that easily fits in a pocket of a jacket. The apparatus takes moving pictures and still pictures, and further records and reproduces video signals from an external apparatus.

1 Claim, 7 Drawing Sheets

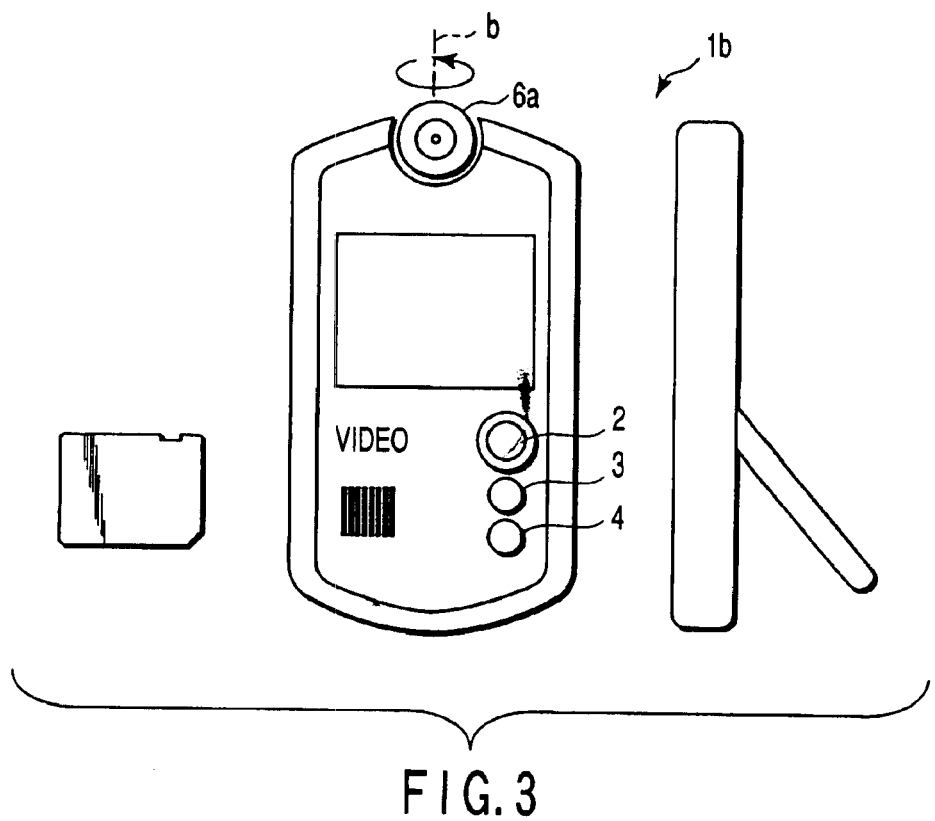
F I G. 3
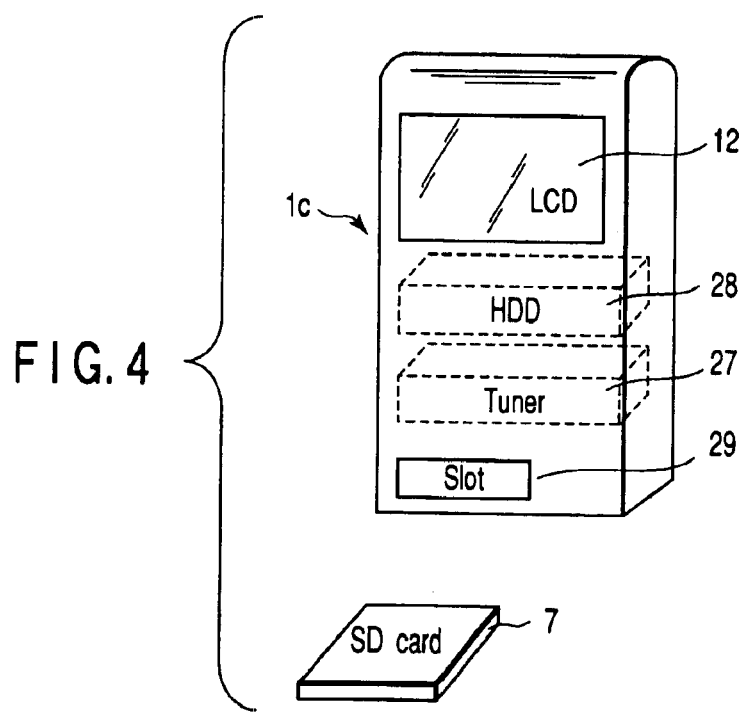
F I G. 4

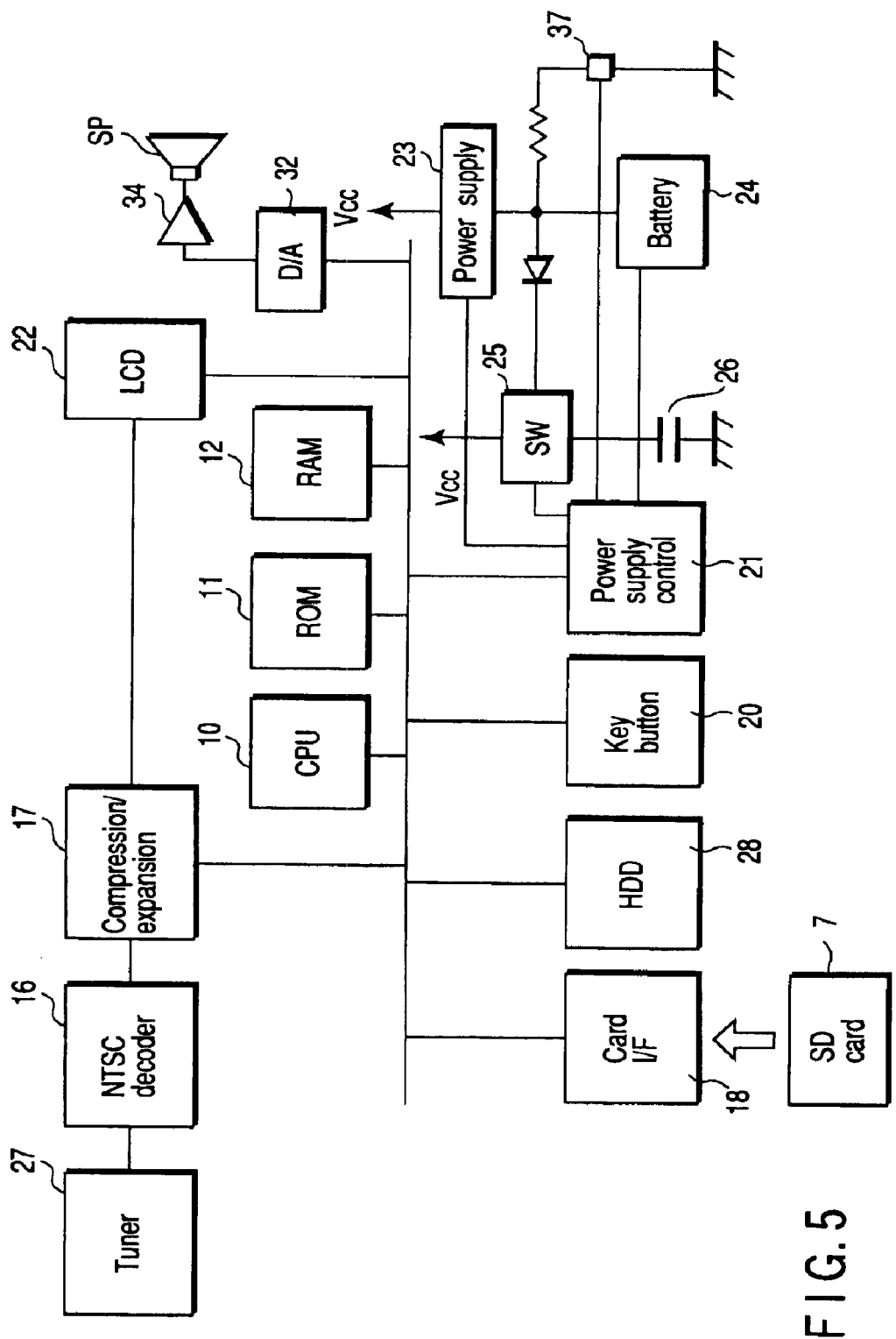
F I G. 5

US 6,876,432 B2

MOVING PICTURE RECORDING/REPRODUCING APPARATUS AND SCHEDULE SETTING METHOD THEREOF

CROSS-REFERENCE TO RELATED APPLICATIONS

This application is based upon and claims the benefit of priority from the prior Japanese Patent Application No. 2002-024757, filed Jan. 31, 2002, the entire contents of which are incorporated herein by reference.

BACKGROUND OF THE INVENTION

1. Field of the Invention

The present invention relates generally to an apparatus for recording and reproducing moving pictures, and more particularly to a portable electronic device.

2. Description of the Related Art

A audio information recording apparatus is disclosed in Jpn. Pat. Appln. KOKAI Publication No. 10-111917, as a portable recording apparatus which is easy to carry by hand and simple to operate. The apparatus disclosed in the above publication comprises a speaker opening, an LCD portion, an ERASE/FORMAT button, etc., provided in a front portion of a main body, a cover for a memory card slot provided in a back portion, a microphone opening, an LED, etc., provided in a top side portion, operation buttons, such as a recording button, provided in a right side portion, and a battery cover provided in a bottom side portion. Therefore, in this apparatus, the area of the front portion of a housing, which is the apparatus wrapping body, is minimized as much as possible, so that the apparatus can be held in one hand. The operation buttons are provided in a position where they can be operated easily. Since such the conventional portable audio information recording apparatus as described above can be operated with one hand, recording can easily be started. Thus, the apparatus is suitable for recording speech in a conference, etc.

In the prior art, there is a portable recording apparatus for audio or still pictures. However, such an apparatus cannot record moving pictures. Thus, if moving pictures need to be taken away from home, a separate digital camera is necessary. Since the digital video cameras use videotapes or optical discs as recording media, the size of the digital cameras is necessarily large.

There is also a problem that the conventional portable audio recording apparatus is limited in its range of use, since the apparatus is designed to be used solely, and cannot reproduce contents, such as video or music, recorded at home or at the office by other apparatuses.

BRIEF SUMMARY OF THE INVENTION

The main object of the present invention is to provide a moving picture recording/reproducing apparatus which has a size comparable to the conventional portable audio recording apparatus which is small, and can record and reproduce moving pictures.

According to one aspect of the present invention, there is provided a portable moving picture recording/reproducing apparatus comprising: a portable housing; a battery which is provided in the housing and supplies power to each electric component which forms the recording/reproducing apparatus; a camera portion to take a moving picture and a still picture; a video encoder which compresses a video signal obtained from the camera portion; a microphone to record sound; a audio encoder which compresses an audio signal obtained from the microphone; an input section which inputs a video signal and an audio signal from an external apparatus; a card slot to receives a memory card that records video data and audio data encoded by the video encoder and the audio encoder; a recording section which records the encoded video data and audio data in the memory card inserted in the card slot; a audio output section which reproduces and outputs the audio data recorded in the memory card; and a video output section which reproduces and outputs the video data recorded in the memory card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram schematically showing the structure of the portable recording unit 1a;

FIG. 3 shows a modification of the portable recording unit 1a shown in FIG. 1;

FIG. 4 shows the structure of a portable recording unit 1c according to a second embodiment of the present invention;

FIG. 5 is a block diagram schematically showing the structure of the portable recording unit 1c;

DETAILED DESCRIPTION OF THE INVENTION

An embodiment of the present invention will be described below with reference to the drawings.

Figure 1:
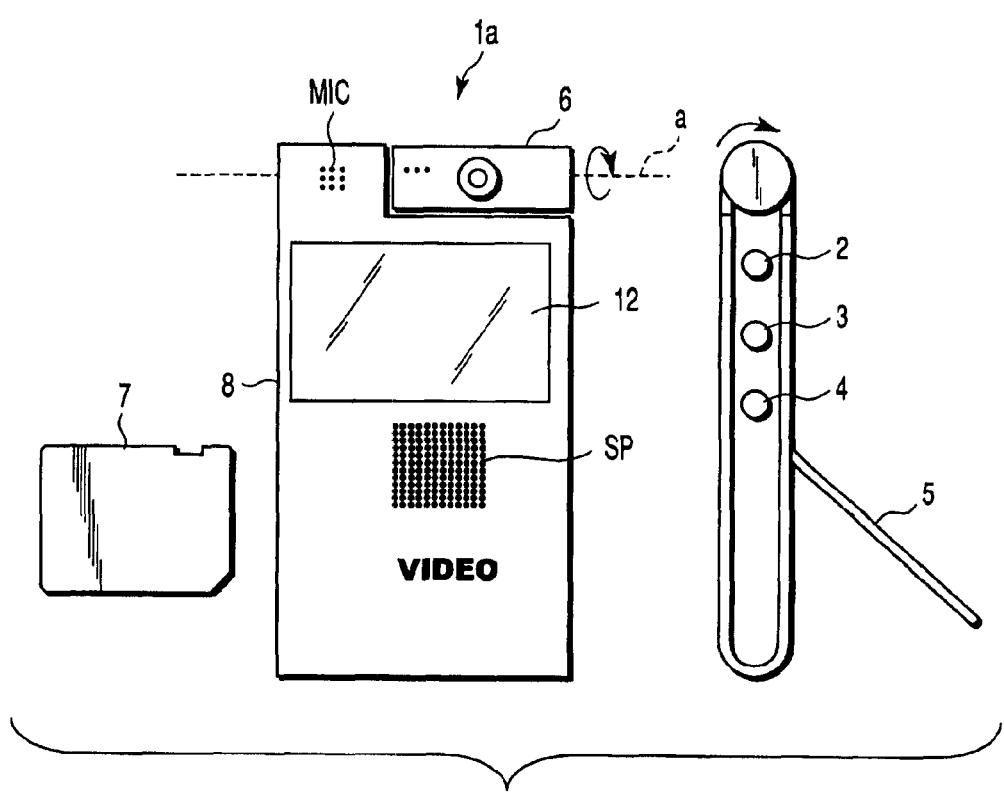
FIG. 1 shows the appearance of a portable recording unit 1a according to a first embodiment of the present invention.

FIG. 1 shows the appearance of a portable audio/moving-picture recording/reproducing apparatus (hereinafter referred to as "portable recording unit") 1a according to a first embodiment of the present invention. A camera module 6 rotates about an axis a of a housing 8. Reference numeral 2 denotes a video/audio recording button for recording moving pictures, numeral 3 denotes a audio recording button in the case of recording sound only, and numeral 4 denotes a shutter button for taking still pictures.

The portable recording unit 1a takes moving pictures or still pictures using the camera module 6, inputs sound using a microphone MIC, inputs an external video signal, and records information on moving pictures, still pictures and sound in a memory card 7 inserted into a card slot (not shown) of the recording unit 1a. The portable recording unit 1a reads out the information on moving pictures and still pictures from the memory card 7 to be displayed on an LCD 12. The portable recording unit 1a reads out the audio information from the memory card 7 and outputs sound from a speaker SP. The portable recording unit 1a has such a size that easily fits in a breast pocket of a jacket, and can also be put in a breast pocket with a commutation-ticket holder superposed thereon.

Figure 2:
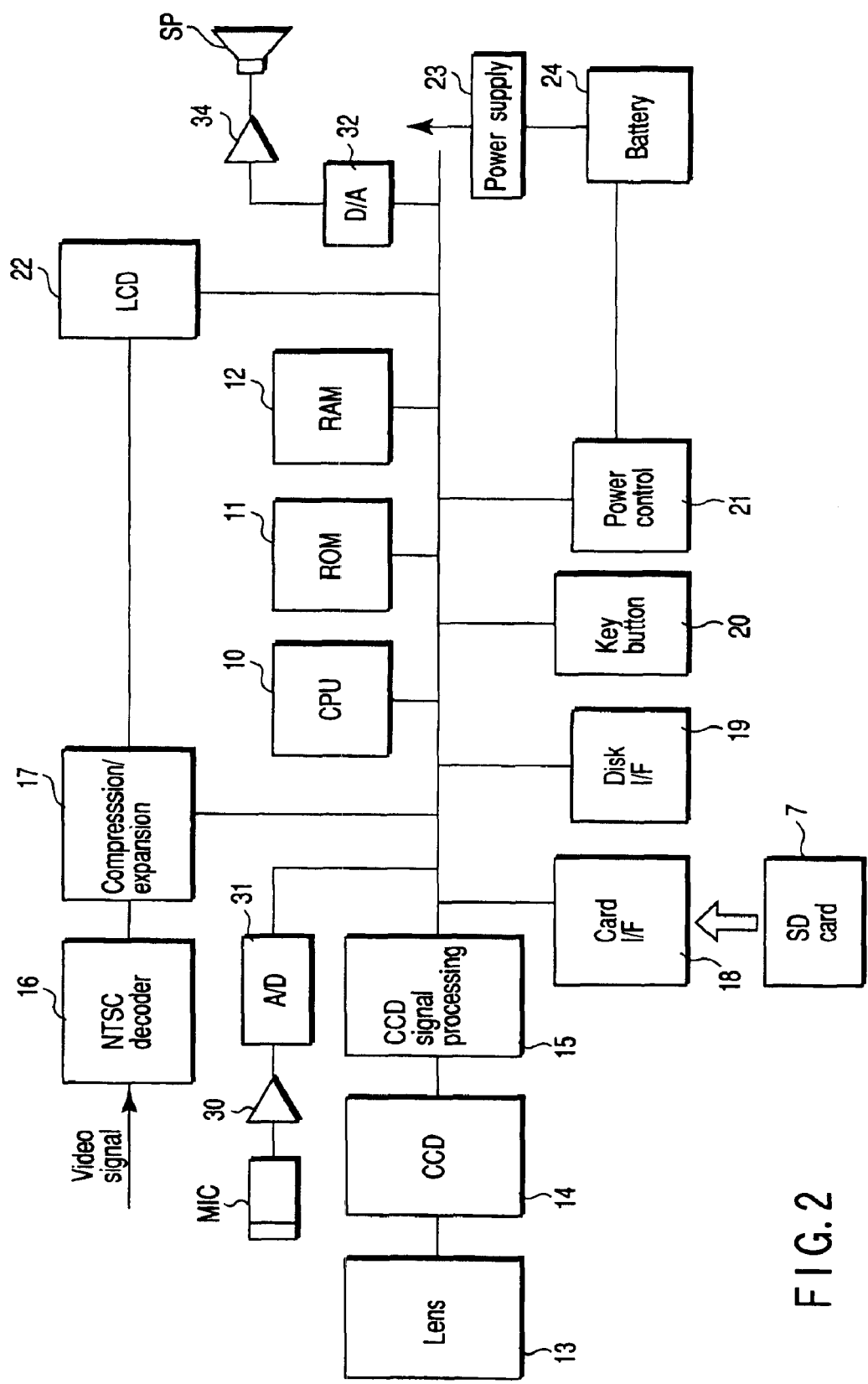

FIG. 2 is a block diagram schematically showing the structure of the portable recording unit 1a. A CPU 10 executes programs including a program of the present invention, stored in a ROM 11, and uses a RAM 12 as a work area. A key button 20 includes the video/audio recording button 2, the audio recording button 3 and the shutter button 4. The CPU 10 controls each section in the apparatus in accordance with the user input information obtained from the key button 20.

An NTSC decoder 16 processes a video signal received by a tuner or a VTR, etc., to output digital video data. This video data is MPEG compressed by a compressor/expander 17 and recorded in an SD memory card (memory card with a copy protection function) 7 via a card I/F 18.

An image of an object is formed on a light-receiving surface of a CCD 14 via a lens 13. The CCD 14 outputs a video signal. The video signal corresponds to a moving picture or still picture. A CCD signal processing section 15 processes the video signal from the CCD 14 to output digital video data. As a camera portion of the lens 13, CCD 14 and CCD signal processing section 15, a small-sized camera module (CIF camera) can be used. The video data is compressed with, for example, MPEG 4, by the compressor/ expander 17, and recorded in the SD memory card 7 via the card I/F 18. The compressor/expander 17 includes an MPEG4 codec, for example. The SD memory card 7 allows two-hour moving picture recording in an SP mode if the capacity is 128 MB, for example. In such a case, the frame rate is about 15 frames/sec.

The sound signal obtained by the microphone MIC is amplified by an amplifier 30, and is analog-to-digital converted by an A/D converter 31. The digital audio data is compressed by the compressor/expander 17, and recorded in the SD memory card 7. The recording time is about 35 hours and 40 minutes, if the capacity of the SD memory card is 128 MB, for example.

The video data recorded in the SD memory card 7 is supplied to the compressor/expander 17 via the card I/F 18, expanded by the compressor/expander 17, and displayed on the LCD 22. The LCD 22 is an LCD having a back light or front light, with a size of, for example, 2 inches. The resolution is, for example, 160×120 pixels.

The audio data recorded in the SD memory card 7 is supplied to the compressor/expander 17 via the card I/F 18, expanded by the compressor/expander 17, analog-to-digital converted by a D/A converter 32, and amplified by an amplifier 34. After that, the sound is output from a speaker.

If the charge amount of a battery 24 falls below the minimum admissible value, a power control section 21 informs the CPU 10 of this. The CPU 10 displays on the LCD 12 that the battery power is low. If a disk I/F 19 is connected to an HDD, recording time can be increased.

If the conventional portable video camera is used for recording only sound, after recording moving pictures, the mode is changed to a audio recording mode and then a recording start button is pressed, thereby starting recording. However, in the present invention, by directly pressing the audio recording button 3, audio recording starts. Further, by directly pressing the shutter button 4, still pictures can be recorded.

Examples of usage of the portable recording unit 1a of the present invention are moving picture recording in a seminar or conference, picture recording at the time of viewing an exhibition, audio recording in a conference, etc. Further, by using the portable recording unit 1a, it is possible to view, anywhere such as inside a car, educational-material video such as an English conversation recorded in the SD memory card, or a TV program which has been recorded in a VTR, etc., but not seen due to the lack of time.

FIG. 3 shows a modification of the portable recording unit 1a of FIG. 1. A portable recording unit 1b comprises a video/audio recording button 2, a audio recording button 3, and a shutter button 4 on the front side of the unit, like the LCD. A camera portion 6a rotates about an axis b.

Next, a second embodiment of the present invention will be described. FIG. 4 shows the structure of a portable recording unit 1c according to a second embodiment of the present invention. In comparison with the portable recording unit 1a, this portable recording unit 1c comprises a TV tuner 27 and an HDD 28, and does not include elements relating to a camera and a microphone.

FIG. 5 is a block diagram schematically showing the structure of the portable recording unit 1c. The tuner 27 receives a broadcast wave transmitted from a broadcasting station, and supplies an NTSC video signal to an NTSC decoder 16. The operation of the NTSC decoder 16 and the following operations are the same as those of the first embodiment shown in FIG. 2. The HDD 28 has a capacity of about 10 GB, and records MPEG4 data (compressed video data). The recording/reproducing operation is the same as that of the first embodiment shown in FIG. 2.

In the prior art, an "END signal" is added to the end of a video file recorded in the HDD, thereby performing recording in units of files with a reproducible size. However, in this method, since the "END signal" is not added to the video data in which the reproducible sized file has been recorded halfway due to the cutoff of power supply, etc., it is regarded as trash, and cannot be reproduced. However, the embodiment of the present invention makes it possible to reproduce recorded video data even if the power supply is cut off.

Figure 6:
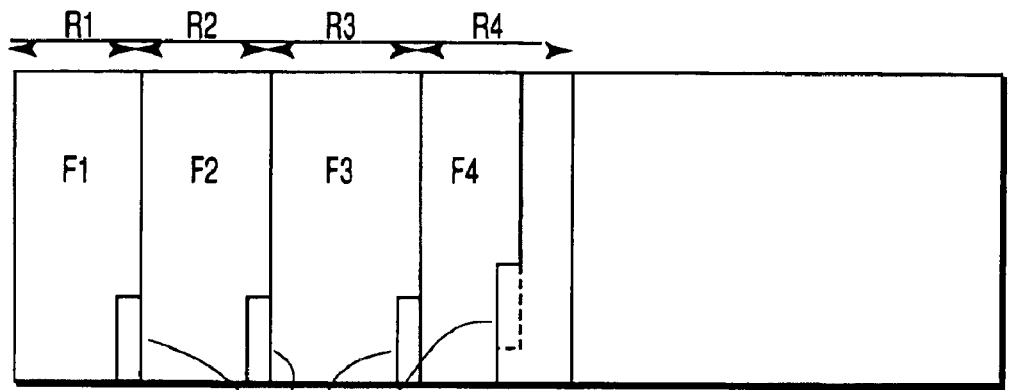
FIG. 6 shows a storage area of an SD memory card 7 or an HDD 28 divided into reproducible ranges.
Figure 7:
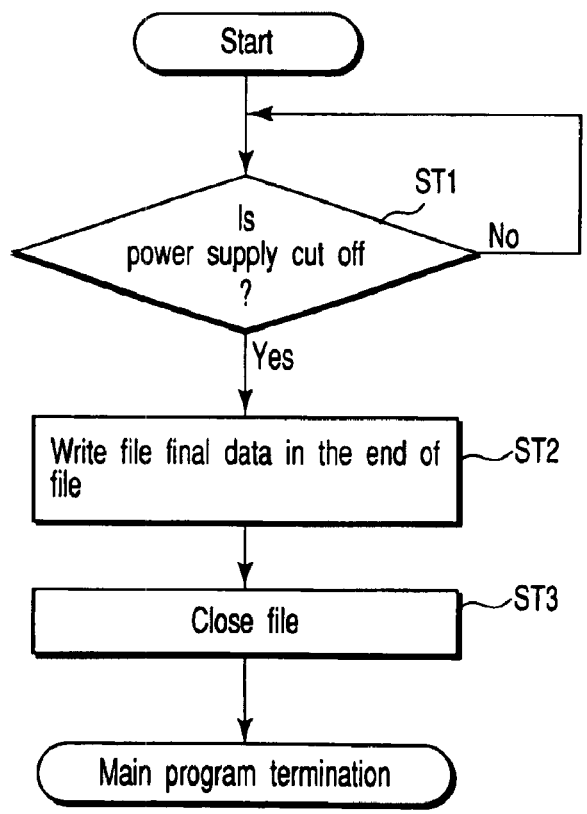
FIG. 7 is a flowchart of the operation of the second embodiment in the case where power supply is cut off.

FIG. 6 shows a storage area of an SD memory card 7 or an HDD 28 divided into reproducible ranges. FIG. 7 is a flowchart of the operation of the second embodiment in the case where power supply is cut off.

During the recording of moving pictures, if a power button 37 is pressed or if the charge amount of the battery 24 falls below a predetermined level and the power supply is cut off, the power supply control section 21 turns on a switch 25 and turns off a power switch 23, thereby supplying the apparatus with a backup power (condenser 26). The power supply control section 21 sends a POWER DOWN signal to the CPU 10. The CPU 10 detects by this signal that the power supply is in a cutoff state (ST1), and adds the "END signal" to the end of the video data being partially recorded, thereby recording the video data (ST2). FIG. 6 shows such a state as above. F1 to F4 indicate each video file (program), and R1 to R4 indicate the range of each video file. The END signal is written in the end of each program. F1 to F3 indicate a file which has successfully been completed (for example, a file whose recording has been normally completed by the user's pressing of a finish button). F4 indicates the "END signal" written when the power supply is cut off during recording. The END signal 8 indicates the end of the reproducible range.

By writing the END signal as described above, the program file which has partially been recorded in the SD card 7 or HDD 28 is closed (ST3). At the time of reproduction, the video data to which the END signal 8 is added is regarded as one reproducible file. Thus, the video data which has partially been recorded due to the cutoff of the power supply becomes reproducible.

If the CPU 10 finishes writing of the END signal 8, the CPU 10 sends a POWER OFF signal to the power control section 21. The power control section 21 which receives the POWER OFF signal turns off the switch 25, and the power supply of the apparatus is cut off.

As described above, by adding the END signal to the interrupted video data which is not reproducible in the conventional method, recording in the reproducible form can be achieved.

Next, a third embodiment of the present invention will be described.

The conventional moving picture recording/reproducing apparatus uses an HDD or optical discs such as DVD-RAM. Thus, the video data recorded therein cannot be reproduced in a portable electronic device. This embodiment aims at moving data from a large-capacity stationary apparatus which handles an HDD or DVD-RAM to a small apparatus such as a card, thereby reproducing moving pictures and sound in a portable recording device.

Figure 8:
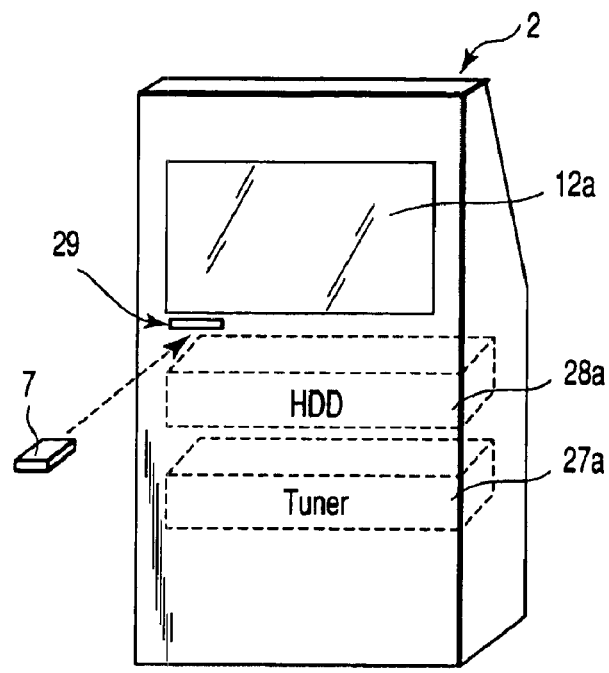
FIG. 8 shows the structure of a stationary recording unit 2 according to a third embodiment of the present invention.
Figure 9:
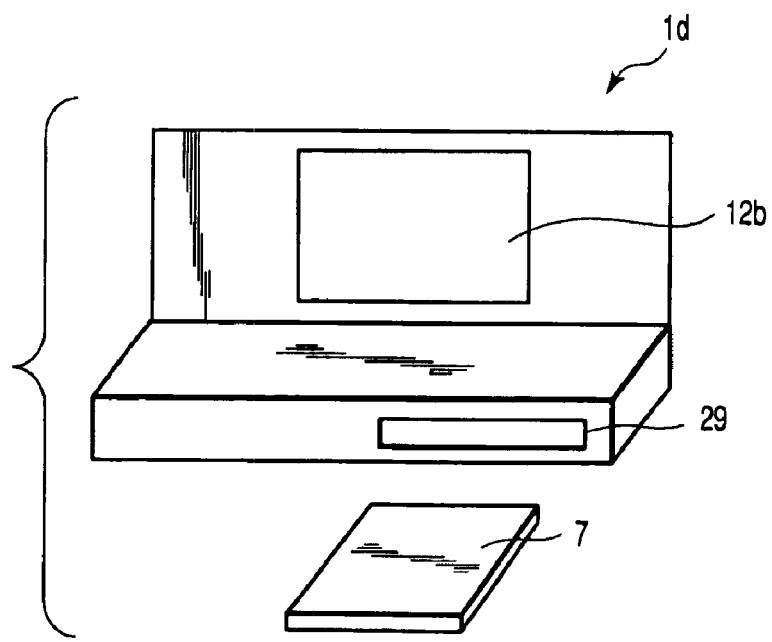
FIG. 9 shows the appearance of a portable reproducing unit which reproduces moving pictures copied in a memory card 7 by the recording unit 2 of FIG. 8.

FIG. 8 shows the structure of a stationary recording unit 2 having a built-in TV tuner 27a and an HDD 28a according to this embodiment. The structure of the recording unit 2 is the same as that of the apparatus shown in FIG. 4. However, the recording unit 2 has an input portion (line in) for inputting video data from an external apparatus as described later. The recording unit 2 receives, for example, a TV broadcast program from the tuner 27a, and MPEG compresses the video data of the program to be recorded in the HDD 28a. The video data recorded in the HDD 28a is selectively copied in the memory card 7 under control of the CPU 10. FIG. 9 shows the appearance of a portable reproducing unit which reproduces moving pictures recorded in the memory card 7 by the recording unit 2 of FIG. 8. As the portable reproducing unit, the portable recording unit 1a shown in FIG. 1 can be used.

In the prior art, if a video signal from a TV or line in is digitally recorded, the HDD is used. The data which is encoded with MPEG 2 is written in the HDD, and recording of a video title (program) is performed. If the title is copied and stored, a part of the title is cut out, and the data of this part is copied in an optical disc such as a DVD-RAM. If the stored video data is reproduced, the disc is inserted in the apparatus to perform reproduction processing. However, optical discs have a drawback of being unsuitable for reproduction in a portable apparatus, since their size makes them inconvenient to carry and power consumption for driving is also high.

In this embodiment, if a video signal from a TV or line in is digitally recorded, the HDD 28a is used. The data formed by encoding the video signal and audio signal with a bit rate equivalent to MPEG 2 or lower is written in the HDD. Specifically, encoding is performed with MPEG4 at 1 Mbps or less. The encoded data is recorded in the HDD 28a of 30G or more. The recording unit 2 supports a plurality of encoding modes. The recording unit 2 can also perform recording for 200 hours or more at the minimum bit rate, and perform continuous recording for one week or more.

If the title is copied, the data is copied from the HDD 28a to the card-type memory 7, thereby storing the data. The data is copied in units of titles, and copying of all the data concerning the title, such as directory information or title attribute information, is performed. Thus, the memory card 7 can hold the same information as in the HDD, even though it is a card. Since the memory card can be driven in a portable electronic device, the data is reproduced in a portable reproducing unit 1d having a card slot 29 and an information expander, thereby reproducing moving pictures anywhere.

As described above, video data of one week or more are stored in a large-capacity medium, and the data is copied in a medium applicable to a portable apparatus, thereby reproducing the moving pictures. Even if a program being broadcasted once in a week cannot be seen within one week from the time when the program is recorded, the program remains in the large-capacity medium.

As a modification of this embodiment, it is possible, when video data is copied in a card, to write the video data with a format different from that of the HDD 28a under control of the CPU 10, thereby performing processing to maintain compatibility with other apparatuses. For example, in a portable terminal having a telephone function, in many cases, a specific format is used. In order to perform reproduction in such a portable terminal, the format of recorded data needs to conform to that of the portable terminal. However, it often takes much time to convert the compression method. Thus, only the conversion of the format is performed without changing the compression method. That is, conversion of location of each item of data is performed. In such a way, data of a format which is compatible with a wide variety of apparatuses is formed.

Further, in order to reduce the time for copying, the CPU 10 writes data in the HDD 28a and the card simultaneously when recording of a TV program is performed. This processing makes it possible, when the recording is finished, to use the data in the card without copying the data in the card. That is, if the recording is finished, the memory card can be extracted immediately, and can be used for reproduction in the portable apparatus.

In this embodiment, it is possible to perform a plurality of video recording settings at overlapping times. It is also possible to perform recording on the rotating HDD 28a at a high bit rate under control of the CPU 10, and on the unrotatable memory card 7 at a low bit rate.

Figure 10:
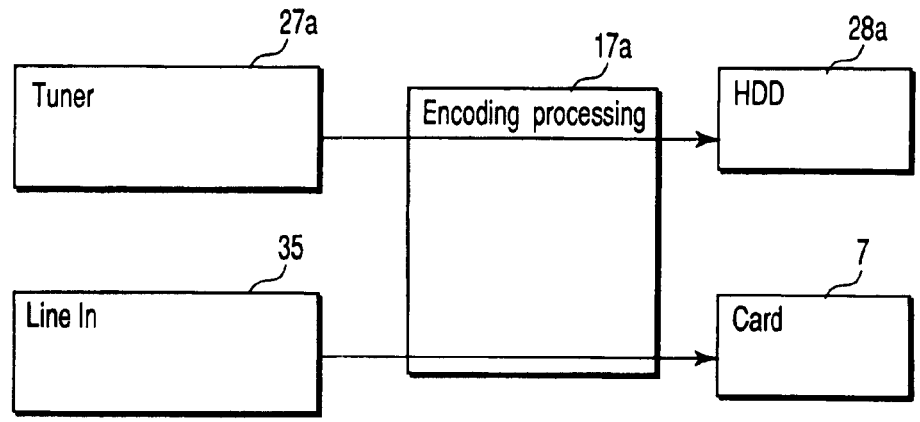
FIG. 10 shows processing of separately compressing video/audio signals from different inputs.

As another modification of this embodiment, it is possible to separately compress video/audio signals from different inputs, and write them in different media, thereby performing recording of a plurality of channels. FIG. 10 shows an example in which a video signal obtained from a tuner 27a is MPEG compressed in an encoding processor 17a to be recorded in the HDD 28a, and a video signal obtained from an external input 35 is MPEG compressed in the memory card 7 to be recorded.

Next, a fourth embodiment of the present invention will be described.

In this embodiment, recording media such as an HDD having a source (video file), or memory cards such as an SD card to which data is copied, are provided in advance with information as to which part of the HDD is to be copied. By adopting this method, copying is automated.

For example, if the user finds a program which he/she wants to see, in a newspaper, magazine, or cellular phone while the recording unit 2 performs recording for a long time, the user inserts the memory card in a PC, cellular phone, PDA, etc, and operates to set the recording schedule, thereby recording the schedule information in the memory card.

Figure 11:
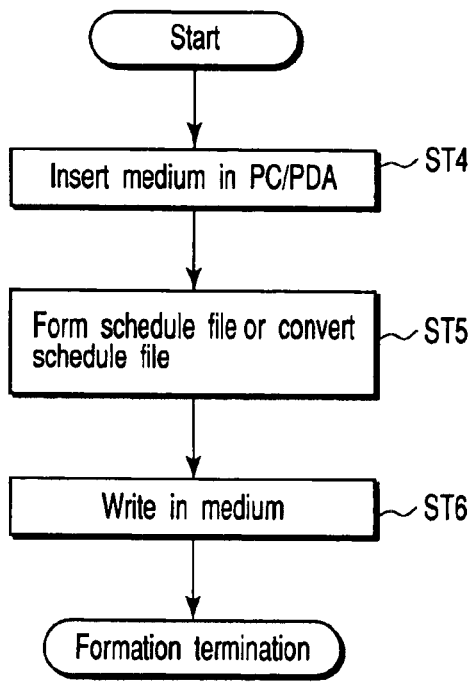
FIG. 11 is a flowchart of processing of forming a schedule file in a recording medium according to the present invention.

FIG. 11 is a flowchart of processing of forming a schedule file in a recording medium of the present invention. First, an apparatus such as a PC displays a program schedule screen on an LCD, etc. The user inserts a memory card such as an SD card into the apparatus (ST4), inputs program start/finish time, or inputs a code representing the program as schedule information. Based on the schedule information input by the user, the apparatus forms a schedule file (ST5), and writes the schedule file in the memory card (ST6). In this case, information as to which channel and which time period the recording unit 2 records is written in the card. If it is not written in the card, an inquiry needs to be made by a cellular phone, etc., to the apparatus to confirm this.

Figure 12:
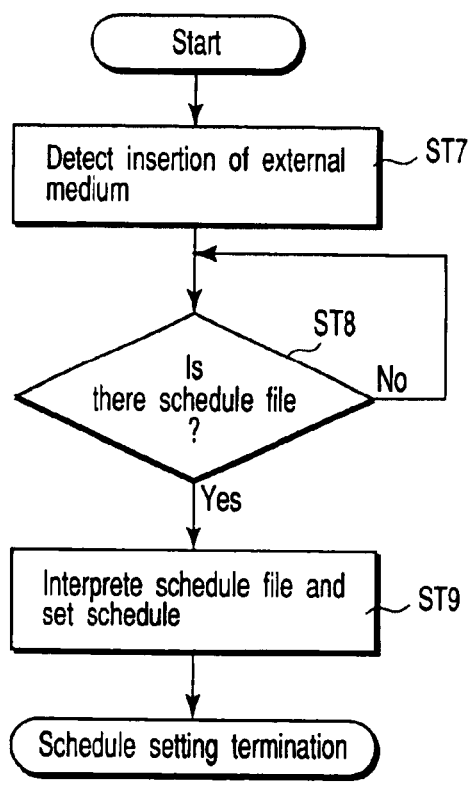
FIG. 12 is a flowchart of a schedule setting operation according to the present invention.

FIG. 12 is a flowchart of a schedule setting operation of the recording unit 2. If the recording unit 2 detects that an external medium such as the memory card 7 is inserted (ST7), the recording unit 2 determines whether the schedule file formed in step 5 is recorded in the inserted medium or not (ST8). If the schedule file is recorded, the recording unit 2 interprets the schedule file and stores the schedule information in the apparatus (ST9). After that, the recording unit 2 copies the video data corresponding to the schedule information from the HDD 28*a* to the memory card 7. Thereby, data copying starts automatically from the HDD 28*a* to the memory card 7 when the user inserts the memory card into the slot 29. In such a manner, by providing the HDD or memory card with information to be copied, copying can start automatically.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A schedule setting method in a moving picture recording/reproducing apparatus having a rotatable recording medium and a card slot to receive a removable and nonrotatable recording medium, comprising:

determining, if the nonrotatable recording medium is inserted in the slot, whether a schedule file is recorded in the inserted recording medium;

setting, in the apparatus, schedule information contained in the schedule file, if the schedule file is recorded in the inserted recording medium; and copying video data corresponding to the schedule information from the rotatable recording medium to the non rotatable recording medium.

* * * * *